United States Patent
Hansen et al.

[11] Patent Number: 5,986,730
[45] Date of Patent: Nov. 16, 1999

[54] DUAL MODE REFLECTIVE/TRANSMISSIVE LIQUID CRYSTAL DISPLAY APPARATUS

[75] Inventors: Douglas P. Hansen, Spanish Fork, Utah; John E. Gunther, Torrance, Calif.

[73] Assignee: Moxtek, Orem, Utah

[21] Appl. No.: 09/203,006

[22] Filed: Dec. 1, 1998

[51] Int. Cl.$^6$ ................................................. G02F 1/1335
[52] U.S. Cl. ................................ 349/96; 349/68; 349/117
[58] Field of Search ................................. 349/68, 96, 98, 349/114, 117, 110; 359/485, 486, 488; 345/38, 87

[56] References Cited

U.S. PATENT DOCUMENTS

| | | |
|---|---|---|
| 4,492,432 | 1/1985 | Kaufmann et al. . |
| 4,688,897 | 8/1987 | Grinberg et al. ........................ 349/96 |
| 5,139,340 | 8/1992 | Okumura . |
| 5,686,979 | 11/1997 | Weber et al. ............................ 349/96 |
| 5,841,494 | 11/1998 | Hall ......................................... 349/98 |
| 5,899,551 | 5/1999 | Neijzen et al. .......................... 349/115 |

Primary Examiner—Hung Xuan Dang
Assistant Examiner—Tai V. Duong
Attorney, Agent, or Firm—Thorpe, North & Western, LLP

[57] ABSTRACT

A dual mode liquid crystal display device has a liquid crystal material disposed between a first polarizer and a second reflective polarizer. A light source is disposed behind the second polarizer and an absorbing means is disposed behind the second polarizer in front of the light source. The reflective polarizer may be a wire grid polarizer and reflects one polarization back towards the front of the display to create a bright image. The other polarization is passed by the reflective polarizer and absorbed by the absorbing means. The absorbing means may be a third polarizer and a wave plate for rotating the polarization passed by the second polarizer before absorbing it so that the second and third polarizers pass the same polarization so that the light produced by the light source may also pass through to the front of the display. The absorbing means may also be a removable sheet of absorbing material. A controller selectively activates the liquid crystal to selectively alter the polarization of the light as it passes through. A switch may reverse the manner in which the controller activates the liquid crystal so that the same pattern of bright and dark images is maintained when the display switches between an ambient illumination mode and an internal illumination mode.

30 Claims, 5 Drawing Sheets

DUAL MODE REFLECTIVE/TRANSMISSIVE LIQUID CRYSTAL DISPLAY APPARATUS

BACKGROUND OF THE INVENTION

1. Field of the Invention

The present invention relates to a dual mode display apparatus operating in ambient and back-light modes, or reflective and transmissive modes. More particularly, the present invention relates to a dual mode liquid crystal display apparatus utilizing a plurality of polarizers, including a wire grid polarizer, to selectively manipulate light.

2. Prior Art

A typical liquid crystal display device comprises a layer of liquid crystal material sandwiched between front and back transparent plates. Transparent electrodes are located on the inner surfaces of the transparent plates and used to apply electrical signals which alter the light transmission properties of the liquid crystal layer. The transparent electrodes are typically patterned to define the pixel structure of the display device. The surfaces of the transparent electrodes are also treated to ensure a preferred alignment direction for the liquid crystal molecules adjacent to each surface.

The preferred and most commonly used form of liquid crystal display utilizes the well-known "twisted nematic" liquid crystal effect. The twisted nematic effect is preferred because it offers excellent contrast ratio, low driving voltages and a sharp response threshold compatible with current drive circuit technology, wide viewing angle, and good gray-scale rendition.

In a typical twisted nematic liquid crystal display with a backlight, the display sandwich also includes linear polarizers affixed to the outer surfaces of the front and back transparent plates. The liquid crystal layer is aligned at the surfaces such that the polarization vector of light transmitted through the layer is rotated 90 degrees in the absence of an applied electric field, but is not rotated in the presence of an electric field.

The display sandwich also includes linear polarizers affixed to the outer surfaces of the front and back transparent plates. The transmission axis of the first polarizer is generally aligned in parallel to the orientation of the liquid crystal molecules adjacent to the front transparent plate. The transmission axis of the second polarizer is either parallel to, or orthogonal to, the transmission axis of the front polarizer.

In the case where the transmission axis of the two polarizers are orthogonal, the light transmitted through one polarizer is reoriented, in the absence of an electric field, to pass through the opposing polarizer such that the panel is transparent and appears bright to the observer. For this reason, a twisted nematic liquid crystal device with orthogonal polarizers is commonly referred to as operating in the "normally white", mode. In the presence of an electric field, the light transmitted by one polarizer is not rotated and is thus blocked by the second polarizer. Thus, the panel is opaque and appears dark to the viewer. In this manner, the transparent electrodes can be used to apply electric fields to selected areas of the panel to create a visible image in the form of light and dark pixels.

Twisted nematic liquid crystal displays constructed with parallel polarizers operate in what is commonly termed the "normally dark" mode of operation. In the absence of an electric field, the light transmitted through one polarizer is reoriented to be blocked or absorbed by the opposing polarizer such that the panel is opaque and appears dark to the observer. In the presence of an electric field, the light transmitted by one polarizer is not rotated and is transmitted by the second polarizer. Thus, the panel is now transparent and appears bright to the viewer.

In many applications, the liquid crystal display device is illuminated by a light source located behind the rear side of the sandwich and viewed from the opposing side. In this case, the visible image is created by light that passes through the panel a single time. In other applications, however, such as portable communications equipment, low power consumption is critical and the display is illuminated primarily by ambient light. In this case, a reflective element is located behind the liquid crystal sandwich such that the ambient light passes through the sandwich, reflects from the reflective element, and passes again through the sandwich in the opposing direction towards the viewer. Thus the image seen by the viewer is formed by light which has passed through the liquid crystal device twice.

The problems with current ambient-illuminated twisted nematic liquid crystal devices relate to the fact that the light passes through the device twice. The most significant problem, normally referred to as "parallax", occurs because the reflector is located behind the rear transparent plate and the rear linear polarizer at a considerable distance from the liquid crystal layer. The ambient light entering the display is spatially modulated by the liquid crystal layer to form a pattern of light and dark areas where the light impinges upon the rear reflector. After reflection, the light passes through the liquid crystal device in the reverse direction and is again spatially modulated. However, since the display is normally illuminated and viewed at oblique angles with respect to the display surface, the images formed by the two passes through the liquid crystal sandwich generally do not entirely overlap, and a double image, or shadow image, is seen by the viewer under most conditions. Although the shadow image is currently accepted for low resolution displays such as those used in portable phones and calculators, this phenomenon does limit the resolution, or minimum pixel size, of ambient illuminated twisted nematic liquid crystal displays, and prevents the application of such displays in high-information density applications, such as lap-top computers.

An additional problem with current ambient illuminated twisted nematic liquid crystal displays is the additional loss of brightness that occurs due to absorption in the linear polarizers. Note that this would not be a problem with theoretical polarizers that transmit 100% of one polarization while absorbing 100% of the orthogonal polarization. However, current linear polarizers only transmit 85% or less of the preferred polarization. The additional absorption during the second pass through the liquid crystal sandwich results in a loss of at least 30% of the possible display brightness.

A third problem with ambient illuminated liquid crystal display devices is that their performance must be compromised to allow illumination by an internal light when the ambient light is insufficient. The typical method to allow for internal illumination is to use a partially transmissive reflector, or transflector, behind the liquid crystal panel so that some light can be introduced to the display by a light source in back of the panel. Of course, the brightness in the reflective mode is reduced by the fraction of ambient light that is transmitted through this transflector, and the amount of illumination required to adequately light the display from the back must be increased to offset the light reflected back to the source by the transflector.

Alternate methods have been proposed to eliminate the parallax problem in ambient illuminated twisted nematic liquid crystal displays. One method, as described in U.S. Pat. Nos. 4,492,432 and 5,139,340, is to utilize an alternate liquid crystal electro-optical effect that only requires a polarizer on the front side of the display. Since the rear polarizer is not required, the rear reflector can be located on the inner surface of the rear transparent plate in immediate proximity to the liquid crystal layer. While this method eliminates the parallax problem, displays using this method do not provide the high contrast, wide viewing angle, fast response, and smooth gray scale rendition provided by twisted nematic liquid crystal display devices. In addition, these displays cannot be illuminated from the back when the ambient light is insufficient.

Still another method is the Polymer Dispersed Liquid Crystal Display (PDLC) in which the liquid crystal layer itself functions as a diffuse reflector, eliminating the need for polarizers or a separate reflector. While this method offers the potential for high display brightness, the PDLC requires high drive voltages and complex drive waveforms that are not compatible with current drive circuit technology. There is still no alternative which provides the high image contrast, wide viewing angle, fast response, and smooth gray scale rendition provided by twisted nematic liquid crystal displays. Clearly, it would be desirable to develop a method for dealing with parallax in the display while preserving the advantages of the twisted nematic liquid crystal display.

One attempt in the art to overcome some of the foregoing disadvantages is provided in U.S. Pat. No. 4,688,897, to Grinberg, which attempts to improve ambient illuminated twisted nematic liquid crystal displays by incorporating a wire grid reflective polarizer within the twisted nematic liquid crystal device. The wire grid reflects light polarized along the long axis of the wires, and transmits light of the orthogonal polarization. The transmitted light must be absorbed within or behind the display device to provide a high contrast display. The wire grid functions as the rear polarizer, as a specular reflector, and as the rear electrical contact to the liquid crystal layer.

Despite any advantages obtained, the above device was primarily described for operation with ambient light. Although a backlight was provided, the above device does not offer a solution as to how to absorb the ambient light transmitted through the wire grid reflective polarizer while, at the same time, not absorbing or attenuating the light from the source behind the panel. Note that backlights for liquid crystal displays are typically complex optical systems designed to capture the light from one or more lamps and distribute the light uniformly over the surface of the display. These backlights commonly include components such as light guides, diffusers, and reflectors. Thus, unless the ambient light transmitted through the wire grid polarizer is substantially absorbed, some portion of this light will reflect from the backlight components and pass back through the display device, thus lowering the display contrast. Therefore, a display device as described by Grinberg would require a compromise between contrast ratio in the ambient-lit mode of operation and brightness in the back-lit mode.

Other reflective polarizer technologies have been developed, including cholesteric polarizers and multilayer birefringent polymer films. In the future, these types of reflective polarizers may be used within liquid crystal devices in a manner that eliminates the parallax problem, but there still exists a need for an improved ambient-illuminated display that overcomes the parallax problem while maintaining the performance advantages of the twisted nematic liquid crystal effect. In addition, there still exists a need for a dual mode ambient-illuminated and internally-illuminated display.

Therefore, it would be advantageous to develop a liquid crystal display apparatus with reduced parallax. It would also be advantageous to develop a liquid crystal display apparatus capable of high brightness operation with either ambient illumination or internal illumination, without compromising the display contrast in either mode of operation.

OBJECTS AND SUMMARY OF THE INVENTION

It is an object of the present invention to provide a liquid crystal display apparatus which can be efficiently illuminated by available ambient light without parallax.

It is another object of the present invention to provide a liquid crystal display apparatus which can be efficiently illuminated by available ambient light, or efficiently illuminated by an internal source when the ambient illumination is insufficient.

These and other objects and advantages of the present invention are realized in a display apparatus for selectively manipulating light from either an ambient light source or an associated internal light source to produce a visible image visible at a viewing orientation, which defines a front. The light from either source may be unpolarized, or may be characterized as having orthogonal components such as first and second polarizations. The display apparatus has a first polarizer for polarizing the light so that light having mostly one polarization orientation is passed through the first polarizer. Thus, the first polarizer may pass a first polarization and absorb a second polarization.

The display apparatus has a polarization altering means, responsive to applied electric fields, disposed behind the first polarizer for selectively altering the polarization orientation of the light from one polarization orientation to another polarization orientation as it passes through the polarization altering means. The polarization altering means may be a layer of liquid crystal material sandwiched between transparent plates.

The display apparatus has a second polarizer disposed behind the polarization altering means for passing light of mostly one polarization orientation through the second polarizer and reflecting light of mostly another polarization orientation back through the polarization altering means and first polarizer. The second polarizer is preferably disposed immediately adjacent, or in contact with, the polarization altering means to prevent parallax.

In accordance with one aspect of the present invention, the second polarizer advantageously has a generally parallel arrangement of thin, elongated elements. The elongated elements interact with electromagnetic waves of the light to generally (i) transmit light having a polarization orientation perpendicular to the elements, and (ii) reflect light having a polarization orientation parallel with the elements. The second polarizer advantageously may be a wire grid polarizer.

The display apparatus also has a light source disposed behind the second polarizer for producing and directing light towards the second polarizer. This light source will typically be comprised of a light emitter and one or more optical elements such as light guides, reflectors, prism sheets, and diffusers as needed to provide uniform illumination over the surface of the display panel.

The display apparatus advantageously has an absorbing means disposed between the second polarizer and the light source. To achieve maximum efficiency in both the ambient-lit and back-lit modes of operation without compromising the brightness or contrast ratio of the display in either mode, the absorbing means prevents the ambient light passed by the second polarizer from reflecting back through the display, but does not attenuate the light generated by the light source.

In accordance with one embodiment of the present invention, the absorbing means comprises a third linear polarizer and a ¼ wave retardation plate. The second polarizer and the third polarizer are oriented with respect to one another so that the third polarizer passes light having the same polarization orientation as light passed by the second polarizer means. The ¼ wave retardation plate is disposed between the third polarizer and the light emitter. The third polarizer and the ¼ wave retardation plate thus function in combination as a circular polarizer to absorb any light reflected from the surfaces of the light source or other components at the rear of the display.

In accordance with another embodiment of the present invention, the absorbing means advantageously may comprise a sheet of material which absorbs light and which is removably disposed between the second polarizer means and the light source. The sheet advantageously prevents back reflections when the display is operated with ambient illumination, but may be removed to allow operation with internal illumination.

The various components may be configured with respect to one another in various combinations. The first polarizer may pass light having mostly a first polarization orientation. The polarization altering means may selectively alter light from the first polarization orientation to a second polarization orientation. The second polarizer may pass light having mostly the first polarization orientation and reflect light having mostly the second polarization. Alternatively, the second polarizer may pass light having mostly the second polarization orientation and reflect light having mostly the first orientation. The third polarizer, where used, passes light of the same polarization orientation as that passed by the second polarizer.

Consider first the case where the first and second linear polarizers are oriented to pass light of the first polarization orientation. In the absence of an electric field, ambient light transmitted by the first polarizer will be reoriented by the liquid crystal layer to be reflected by the second polarizer such that the display appears bright to the observer. However, light emitted by the internal light source and transmitted through the second polarizer is reoriented by the liquid crystal layer to be absorbed by the first polarizer such that the display is opaque to the internally generated light. Thus, the display operates in the "normally white" mode under ambient illumination and in the "normally dark" mode with internal illumination. The converse will be true if the second polarizer is oriented to reflect light of the polarization direction transmitted by the first polarizer. This reversal of the image contrast can be compensated by altering the pixel drive signals applied to the display.

The liquid crystal layer is divided into a plurality of picture elements which operate independently to either alter the polarization orientation of the light, or allow the polarization orientation of the light to pass through unaffected. In accordance with another aspect of the present invention, the display advantageously has a control means for selectively activating the picture elements to form the desired display image. The control means has at least two modes of operation, including an ambient light mode and a backlight mode. The display also advantageously has switch means for switching between the ambient light and backlight modes of the control means.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

In order to illustrate the features of the invention, it will be described with respect to a twisted nematic liquid crystal display. However, as will become apparent from a reading of the specification, the invention is by no means limited to use with such a display, and may be appropriately used with liquid crystal displays without twist, or with twist angles other than 90 degrees.

Figure 1:
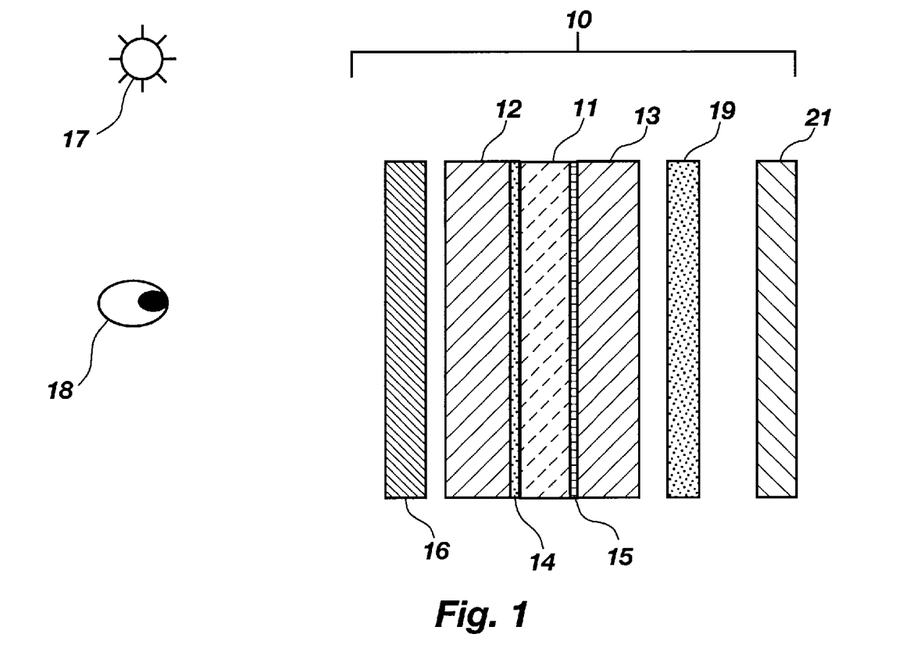
FIG. 1 is a cross sectional schematic view of a dual mode reflective/transmissive twisted nematic liquid crystal display apparatus in accordance with one preferred embodiment of the present invention.

As illustrated in FIG. 1, a display apparatus, indicated at 10, is shown for selectively manipulating light from either an ambient light source 17 or an associated internal light source 21 to produce an image visible at a viewing orientation defining a front. Preferably, the display apparatus 10 is a dual mode reflective/transmissive twisted nematic liquid crystal display.

The display apparatus 10 has a polarization altering means for selectively altering the polarization orientation of the light from one polarization orientation to another polarization orientation as the light passes through the polarization altering means. Preferably, the polarization altering means is a liquid crystal layer 11 sandwiched between a first transparent plate 12 and a second transparent plate 13. A first transparent electrode layer 14 is deposited on the surface of the first transparent plate 12 adjacent the liquid crystal material 11. A second electrode is disposed on the surface of the second transparent plate 13. The second electrode may be a reflective polarizer supported on the surface of the second transparent plate 13 adjacent to the liquid crystal layer 11, as described below.

By suitable treatment of the surfaces of the transparent plates 12 and 13, the molecules of the liquid crystal material 11 can be made to align parallel to the surface of the plates 12 and 13 and in a preferred direction. Such methods and treatments are well known to those skilled in the art. In a twisted nematic liquid crystal display, the transparent plates 12 and 13 are oriented such that the preferred direction of the liquid crystal on plate 12 is orthogonal to the orientation of the liquid crystal on plate 13. This orientation causes the twisted effect in the liquid crystal material in its relaxed state. This effect is described by Fergason (U.S. Pat. No. 3,731,986).

The twisted nematic liquid crystal layer 11 is one example of a polarization altering means. It is understood that any means for selectively altering the polarization orientation of the light from one polarization orientation to another polarization orientation may be used, including for example a homeotropic liquid crystal layer.

The display apparatus 10 has a first polarizer means for polarizing the light so that light having mostly one polarization orientation is passed through the first polarizer means. Preferably, the first polarizer means is an absorptive linear polarizer 16 positioned between the first glass plate 12 and both the ambient light source 17 and a viewer 18 so that the liquid crystal layer 11 is disposed behind the first polarizer 16. An absorptive linear polarizer is one example of a polarizer means. Any means for polarizing the light so that light having mostly one polarization orientation is passed may be used.

The display apparatus 10 also has a second polarizer means disposed behind the liquid crystal layer 11 for passing light of mostly one polarization orientation through the second polarizing means, and reflecting light of mostly another polarization orientation back through the liquid crystal layer 11. Preferably, the second polarizer means is a reflective polarizer 15. Copending U.S. application Ser. No. 116,715 discloses various embodiments of a reflective polarizer device and is herein incorporated by reference.

The second polarizer means or the reflective polarizer 15 is preferably a wire grid polarizer. The wire grid polarizer has a generally parallel arrangement of thin, elongated elements. The elements providing means for interacting with electromagnetic waves of the light to generally transmit light having a polarization orientation perpendicular to the elements, and reflect light having a polarization orientation parallel with the elements.

The wire grid polarizer is one example of a second polarizer means. Any means for passing light of mostly one polarization orientation and reflecting light of mostly another polarization orientation may be used.

As indicated above, the reflective polarizer 15 may be electrically conductive, or may be coated with a transparent conductor, so that it may act as the second electrode. The transparent electrode layer 14 or the reflective polarizer 15 may be patterned and divided into conductive sections that define the picture elements of the display and provide a means for selective application of electric fields to those elements to form the display image.

The display apparatus 10 has a light emitting means disposed behind the reflective polarizer 15 for producing and directing light towards the reflective polarizer 15. The light emitting means may be any appropriate internal illumination source 21. As described above, the illumination source 21 may be comprised of a light emitter and one or more optical elements such as light guides, reflectors, prism sheets, and diffusers as needed to provide uniform illumination over the surface of the display panel.

In addition, the display apparatus 10 advantageously has an absorbing means 19 for absorbing the light passed by the second polarizer 15. The absorbing means 19 is disposed behind the second polarizer 15 or the rear plate 13, and between the second polarizer 15 and the illumination source 21. The absorbing means 19 is configured to prevent ambient light transmitted through the second polarizer 15 from reflecting back through the display device without substantially reducing the brightness of the display when the internal illumination source 21 is employed.

Figure 2:
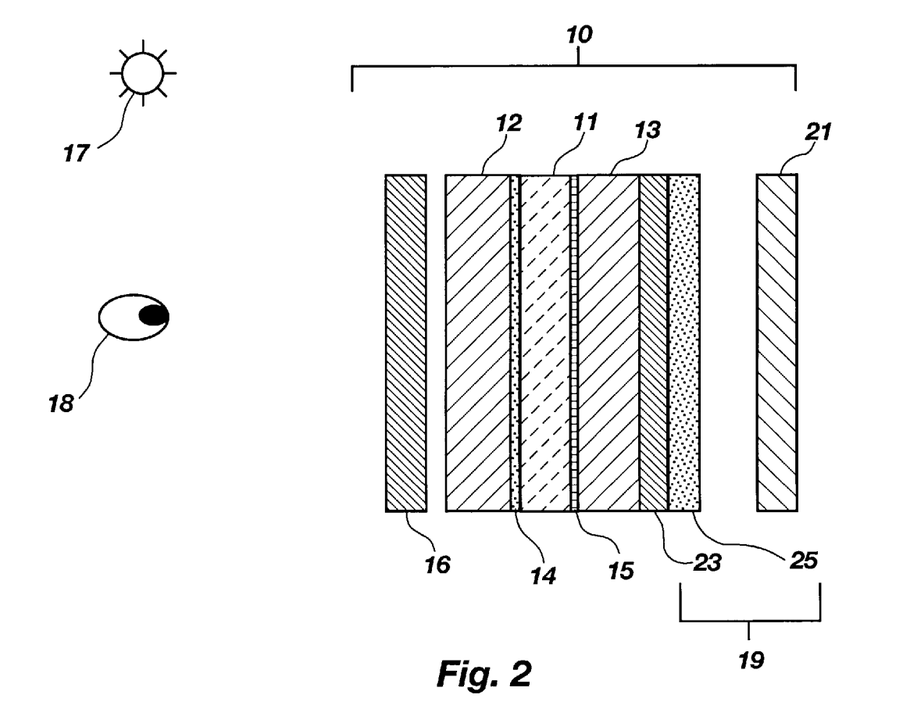
FIG. 2 is a cross sectional schematic view of a dual mode reflective/transmissive twisted nematic liquid crystal display apparatus in accordance with another preferred embodiment of the present invention.

FIG. 2 illustrates a preferred embodiment of the invention. The absorbing means 19 preferably comprises a third polarizer means for polarizing light so that mostly light of one polarization passes through the third polarizer means while light of another polarization orientation is absorbed. The third polarizing means is preferably a linear polarizer 23. Again, the third polarizing means may be any means for polarizing the light.

In addition, the absorbing mean 19 also preferably comprises a polarization reorientation means for reorienting the polarization orientation of the light as the light passed therethrough so that the polarization orientation of any light passing through the third polarizer 23 and the polarization reorientation means and reflecting from the illumination source 21 back through the polarization reorientation means is reoriented from one polarization to another and is thus absorbed by the third polarizer 23. The polarization reorientation means is disposed behind the third polarizer 23, or between the third polarizer 23 and the illumination source 21. The polarization reorientation means is preferably a ¼ wave retardation plate 25 affixed to the second transparent plate 13, with the retardation plate 25 disposed between the third polarizer 23 and the internal illumination source 21. The polarization reorientation means may be any means for reorienting the polarization orientation of the light so that any light passing through the third polarizer 23 and reflecting off the illumination source 21 is absorbed.

The third polarizer 23 and the quarter wave retardation plate 25 are one example of an absorbing means. Any means for absorbing light passed by the second polarizer 15 which may be reflected back through the second polarizer 15 may be used.

The polarizer components may be oriented in various ways consistent with the objectives of the invention. By means of example, the first polarizer 16, the reflective polarizer 15, and the second absorptive polarizer 23 may be oriented to transmit light with the direction of polarization oriented parallel to the liquid crystal molecules at the inner surface of transparent plate 12.

Figure 3:
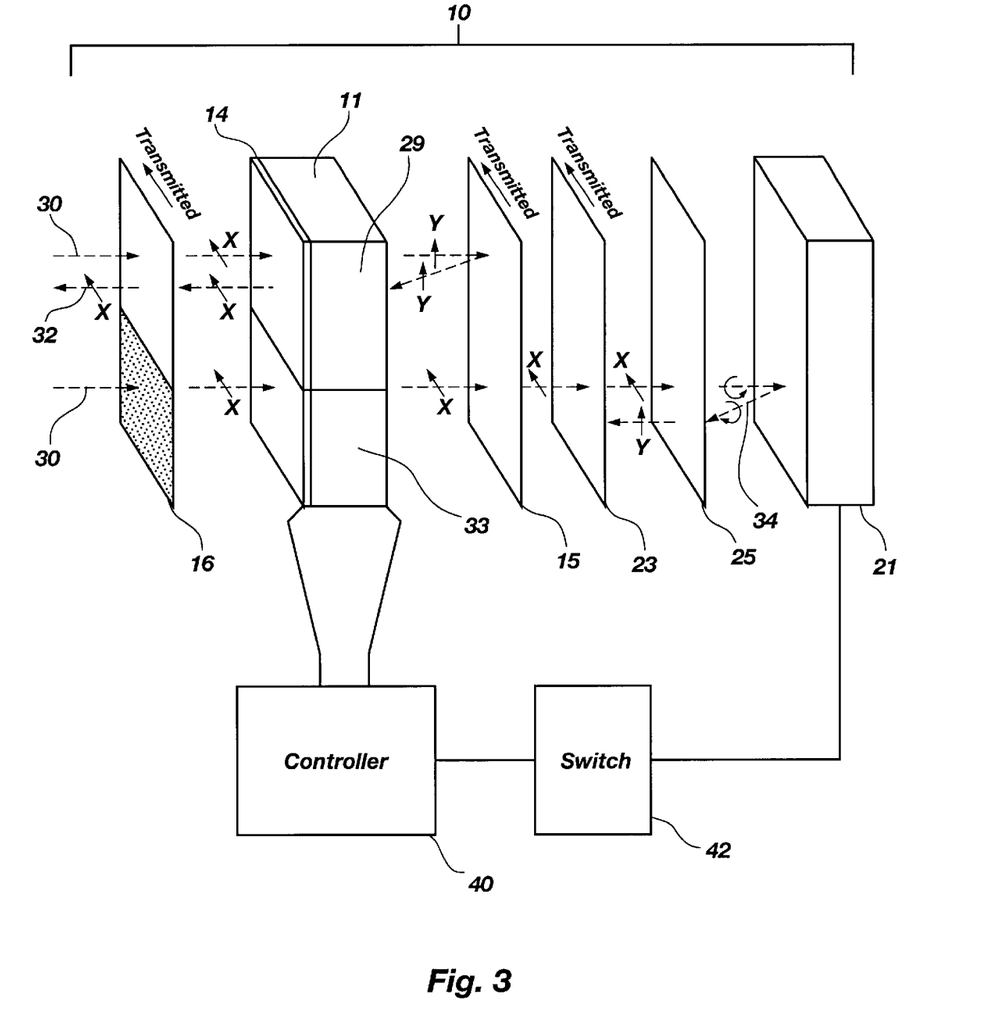
FIGS. 3 and 4 are schematic views of a dual mode reflective/transmissive twisted nematic liquid crystal display apparatus in accordance with the preferred embodiment of the present invention.

Referring to FIG. 3, the operation of the display 10 under ambient illumination is illustrated. In FIG. 3, the two transparent plates are not shown, and the liquid crystal layer is illustrated as two picture elements, indicated by regions 29 and 33, which represent a plurality of picture elements. The picture elements are shown adjacent one another for purposes of illustration. Thus, the polarization altering means, or the liquid crystal layer 11, is divided into a plurality of picture elements, two of which are illustrated. The picture elements operate independently to either alter the polarization orientation of the light, or to allow the polarization orientation of the light to pass through unaffected.

In the absence of an applied voltage, the liquid crystal material is in its relaxed state, indicated by region 29. Ambient light, indicated at 30, is transmitted through the first polarizer 16 with a first orientation, indicated by X, and enters the liquid crystal layer 11. The twist in the orientation of the liquid crystal molecules causes the polarization vector of the light to be rotated to a second orientation, indicated by Y, as the light passes through the liquid crystal layer, such that the light exits the liquid crystal layer with the polarization vector oriented as required to be reflected from the reflective polarizer 15. The reflected light is again twisted upon transmission through the liquid crystal layer such that it passes through the polarizer 16 to the viewer, as indicated at 32. Thus, region 29 and other areas or pixels of the display with no applied electric field will appear bright.

When a voltage is applied between the transparent electrode 14 and the reflective polarizer 15, the liquid crystal molecules rotate towards alignment with the electric field, effectively untwisting the molecular orientation, indicated by region 33. In this event, ambient light transmitted through the first polarizer 16 passes through the liquid crystal layer 11 without change in the direction of the polarization vector. Thus, the light will be transmitted through polarizers 15 and 23 with minimal absorption. This light is circularly polarized upon transmission through the quarter wave plate 25. Some portion of this light will be reflected from the exterior surface of the wave plate 25 and the surfaces of the light source 21. After reflection, the light will pass back through the wave plate 25 and be converted into linear polarization with the polarization axis orthogonal to that passed by polarizer 23. Thus, the reflected light, indicated at 34, will be absorbed in the polarizer 23, and the portions of the display with an applied electric field will appear dark.

Figure 4:
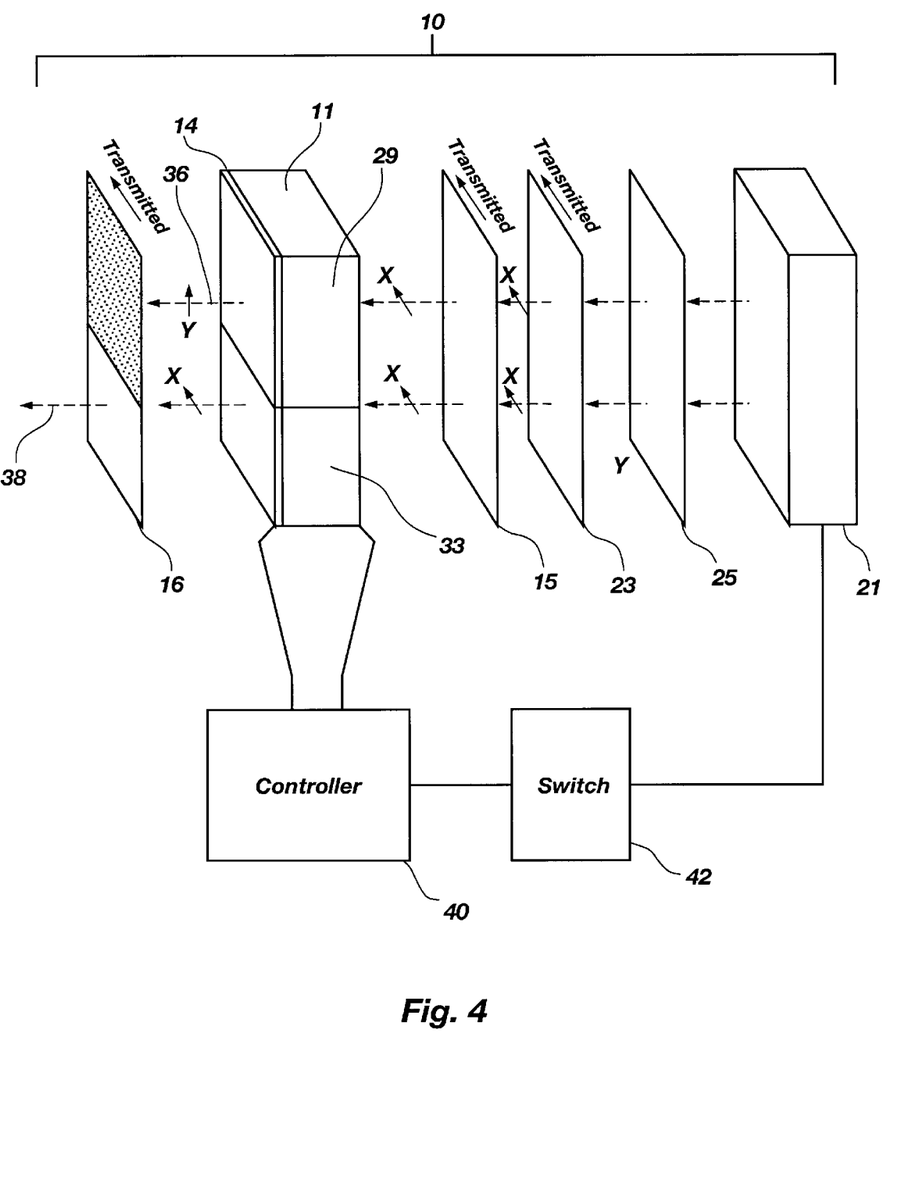

Referring to FIG. 4, the operation of the display 10 under internal illumination is illustrated. When the illumination source 21 is employed, one polarization will be absorbed by the polarizer 23, and the orthogonal polarization, indicated as X, will be transmitted through both polarizer 23 and the reflective polarizer 15. With no voltage applied to the liquid crystal layer, indicated by region 29, the direction of polarization of the light will be rotated upon transmission through the liquid crystal layer, such that the light is absorbed in polarizer 16, indicated at 36. Thus, the areas of the display without an applied voltage will appear dark. With a voltage applied to the liquid crystal layer, indicated by region 33, the polarization of the light is not rotated, and the light is transmitted through polarizer 16 to the viewer, indicated at 38.

The third polarizer 23 and quarter wave plate 25 advantageously function to absorb ambient light transmitted through the reflective polarizer 15, and thus maintain the high contrast ratio of the display in the ambient-lit mode, without compromising the brightness of the display in the back-lit mode.

Note that the polarity of the display will be reversed when the internal light is used. Under ambient illumination, the display appears bright in areas where no voltage is applied across the liquid crystal layer. With rear illumination, the display appears dark in areas with no voltage and bright in areas where a voltage is applied. In the case of simple displays such as the numeric displays used in watches, this contrast reversal cannot be compensated because these displays have no provisions to apply an electrical field to the liquid crystal layer in the areas surrounding the digits. Thus, a typical display that presents dark numerals on a bright background under ambient illumination will present bright characters on a dark background when back-lit. It is believed that this change in display appearance will be acceptable for these applications.

The reversal of image contrast is clearly unacceptable in many other display applications. For example, unless the contrast reversal is compensated, the lawn in a video image would appear green under ambient illumination, but magenta when back-lit. Fortunately, the contrast reversal can be compensated by appropriate changes in the electrical signals applied to matrix displays using any of the well-known single-scan, double-scan, or active matrix addressing techniques. To provide such compensation, the display 10 has control means for selectively activating the picture elements to form the desired display image. The control means may be a controller 40 that generates pixel drive signals to drive the display. The controller 40 has at least two modes of operation, including an ambient light mode and a backlight mode. Additionally, the display apparatus also may have a switch means for switching between the ambient light and backlight modes. The switch means may be a switch 42 for applying power to the backlight and switching between the ambient light and backlight modes of the control means. Preferably, the controller 40 provides drive signals to select picture elements in the ambient light mode so that the display apparatus 10 operates in a normally white mode. In addition, the controller 40 preferably reverses the contrast of the picture elements which receive drive signals in the backlight mode, however, so that the appearance of the display image remains the same between the ambient and backlight modes.

It should also be noted that the described relationship between the liquid crystal molecule orientation and that of the three polarizers in the display is not the only possible or practical orientation. For example, the display device can also be designed to operate with the liquid crystal molecule orientation orthogonal to that of the first absorptive polarizer 16 rather than aligned with the first polarizer, with the other polarizers keeping the orientation described. A similar effect can also be achieved by rotating the two rear polarizers, 15 and 23, by 90 degrees while keeping the front polarizer 16 in the orientation described.

As described above, the first polarizer 16 may be configured for passing light having mostly a first polarization orientation while the liquid crystal layer 11 may be configured to selectively alter light from the first polarization to the second polarization. The second polarizer 15 may be configured to pass light having mostly the first polarization orientation and reflect light having mostly the second polarization. Thus, the absorbing means 19 is configured for absorbing light passed by the second polarization means. Alternatively, the second polarizer 15 may be configured to pass light having mostly the second polarization orientation and reflect light having mostly the first polarization. Thus, the absorbing means 19 again is configured to absorb light passed by the second polarization means.

Any of the known liquid crystal display backlighting methods may be employed, so long as care is taken to ensure that the ambient light is either absorbed by the illumination source or reflected without substantial change in polarization.

One advantage of the present invention over the prior art is that the display provides high contrast and high efficiency in both the reflective mode with ambient illumination and the transmissive mode with the internal illumination source. In both modes, the bright areas of the display direct substantially all of one polarization of the available illumination light to the observer. In addition, in both modes, the dark areas of the display will be very dark because substantially all of the light of the undesired polarization is absorbed within the display. Thus, there is no tradeoff between efficiency in the reflective mode versus efficiency in the transmissive mode, as is the case when a transflector is used in a current display.

Use of the invention can occur in a variety of circumstances, from bright ambient illumination, such as sunlight, to the conditions found on a dark night. Because of the display design, however, conditions exist where there may not be sufficient ambient light for display illumination, but the ambient light available will still cause degradation of the display contrast and viewability. The most straightforward way to address these conditions is to make the internal illumination source brighter. This will increase the power requirements of the display, and also render the display brighter than would be required for other conditions. For these reasons, a dimmable light source in which the brightness of the internal light source can be adjusted to fit the ambient conditions will provide extra utility and ease of use.

Figure 5:
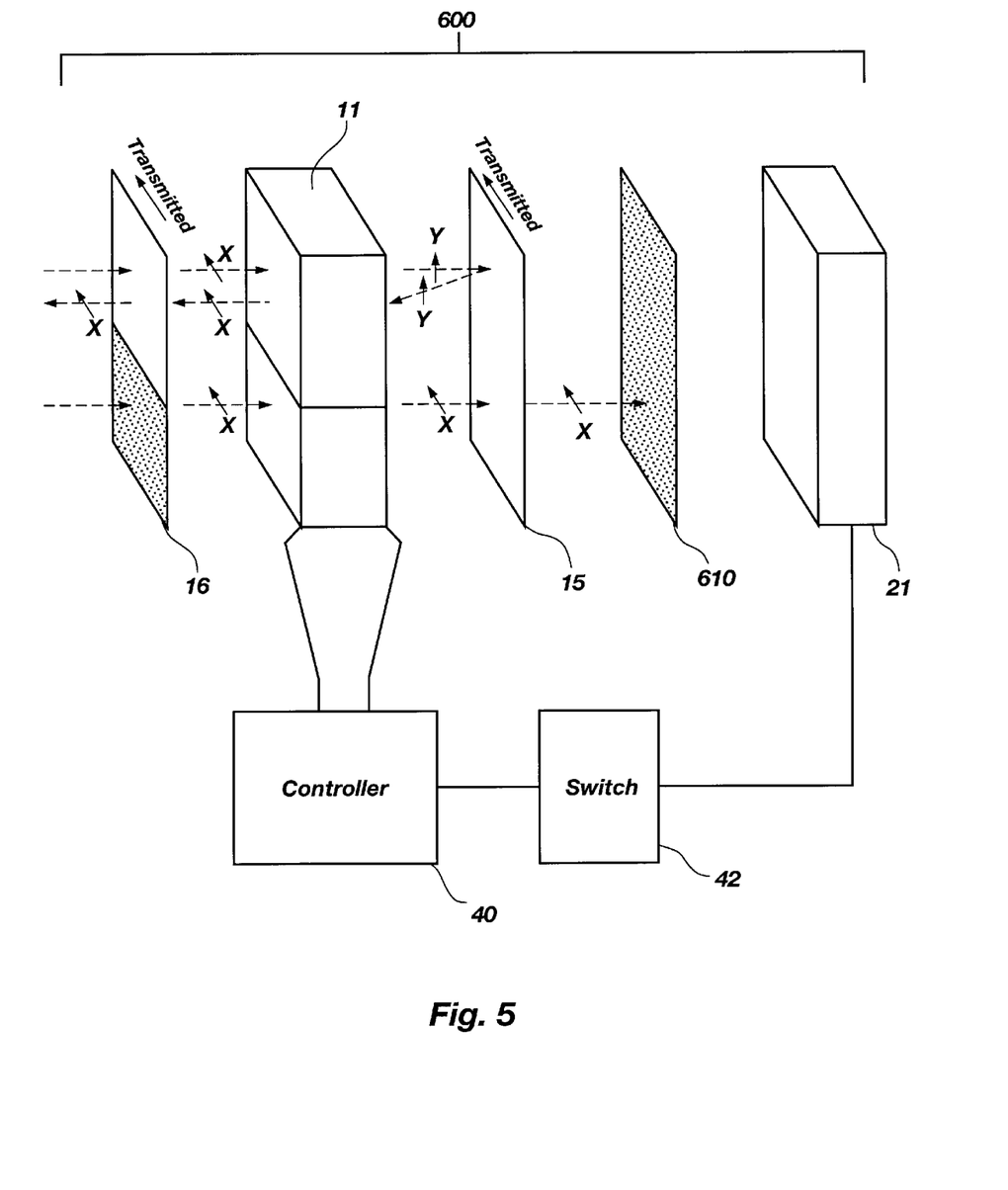
FIGS. 5 and 6 are schematic views of a dual mode reflective/transmissive twisted nematic liquid crystal display apparatus in accordance with an alternative embodiment of the present invention.
Figure 6:
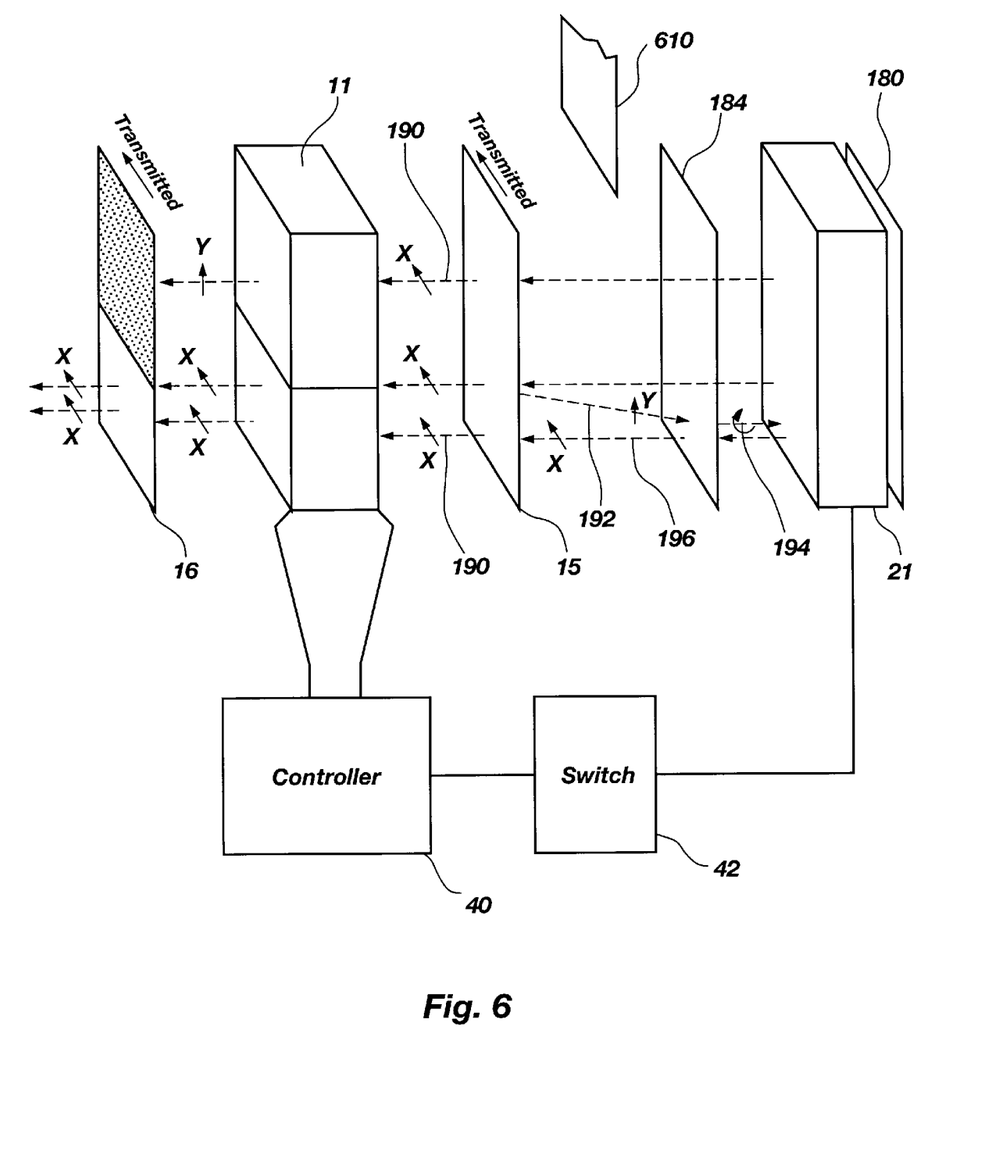

Referring to FIGS. 5 and 6, an alternative embodiment of a display apparatus, indicated generally at 600, is shown operating in the ambient illumination mode, as shown in FIG. 5, and the internal illumination mode, as shown in FIG. 6. The alternative embodiment of the display 600 is similar in most respects to the preferred embodiment of the display 10, as shown in FIGS. 1–4. In the alternative embodiment, however, the display apparatus 600 has a sheet of material 610 which absorbs light and which is removably disposed behind the second polarizer 15. Thus, the sheet 610 absorbs whatever light is passed by the second reflective polarizer 15.

In the ambient illumination mode shown in FIG. 5, the alternative embodiment of the display 600 operates much the same as the preferred embodiment of the display 10, as shown in FIG. 3. In the internal illumination mode shown in FIG. 6, the sheet 610 is removed and the reflective polarizer 15 passes only one polarization, for example the first polarization X, as shown at 190. The remaining light having the other polarization orientation, for example the second polarization Y, is reflected back towards the illumination source, as shown at 192.

The light reflected by the reflective polarizer 15 may be recycled (converted to polarization orientation X and redirected towards the front of the display). The light may be recycled by the incorporation of a second polarization reorientation means for reorienting the polarization orientation, and a reflector means for reflecting light back towards the second polarization altering means and the second polarizer 15. The polarization altering means may be a ¼ wave plate 184 and the reflecting means may be a reflector 180, either within or external to the illumination source 21. The reflected light is converted from the second polarization Y to circular polarization, as shown at 194, by the wave plate 184. After reflection back towards the front of the display by the reflector 180, the light is converted from circular polarization to linear polarization with orientation X, as shown at 196. Therefore, the light is recycled and the display efficiently utilizes the light, rather than discarding a portion of the light.

The sheet 610 may be an appropriately treated polymer film, such as Mylar. In addition, the sheet 610 may be wound on a roll or cylinder coupled to the display to remove the sheet from the path of the light in the internal illumination mode.

While the invention is disclosed and particular embodiments thereof are described in detail, it is not intended that the invention be limited solely to these embodiments. Many modifications will occur to those skilled in the art which are within the spirit and scope of the invention. For example, while the invention has been described in terms of a twisted nematic liquid crystal display, the invention is also applicable for use in other manners, including displays utilizing other liquid crystal materials or electro-optical effects. It is thus intended that the invention be limited in scope only by the appended claims.

What is claimed is:

1. A display apparatus for selectively manipulating light from either an ambient light source or an associated internal light source to produce a visible image visible at a viewing orientation defining a front, the apparatus comprising:

first polarizer means configured for polarizing the light so that light having mostly one polarization orientation is passed through the first polarizer means;

polarization altering means disposed behind the first polarizer means for selectively altering the polarization orientation of the light from one polarization orientation to another polarization orientation as it passes through the polarization altering means;

second polarizer means disposed behind the polarization altering means for passing light of mostly one polarization orientation through the second polarizer means and reflecting light of mostly another polarization orientation back through the polarization altering means and the first polarizer means;

absorbing means disposed behind the second polarizing means and configured for absorbing the light passed by the second polarizer means; and light emitting means disposed behind the second polarizing means for producing and directing light towards the second polarizing means.

2. The apparatus of claim 1, wherein the second polarizer means has a generally parallel arrangement of thin, elongated elements providing means for interaction with electromagnetic waves of the light to generally (i) transmit light having a polarization orientation perpendicular to the elements, and (ii) reflect light having a polarization orientation parallel with the elements.

3. The apparatus of claim 1, wherein the absorbing means comprises a third polarizer, and wherein the second polarizer means and the third polarizer are oriented with respect to one another so that the third polarizer passes light having the same polarization orientation as light passed by the second polarizer means.

4. The apparatus of claim 3, wherein the absorbing means further comprises a ¼ wave retardation plate disposed between the third polarizer and the light emitting means.

5. The apparatus of claim 1, wherein the first polarizer means is configured for passing light having mostly a first polarization orientation, the polarization altering means is configured for selectively altering light from the first polarization orientation to a second polarization orientation, the second polarizer means is configured for passing light having mostly the first polarization orientation and reflecting light having mostly the second polarization, and the absorbing means is configured for absorbing light passed by the second polarizer means.

6. The apparatus of claim 1, wherein the first polarizer means is configured for passing light having mostly a first polarization orientation, the polarization altering means is configured for selectively altering light from the first polarization orientation to a second polarization orientation, the second polarizer means is configured for passing light having mostly the second polarization orientation and reflecting light having mostly the first polarization, and the absorbing means is configured for absorbing light passed by the second polarizer means.

7. The apparatus of claim 1, wherein the absorbing means comprises:

a sheet of material which absorbs light and which is removably disposed behind the second polarizer means.

8. The apparatus of claim 7, further comprising:

second polarization reorientation means disposed between the second polarizer means and the light emitting means for reorienting the polarization orientation of the light as the light passed through the second polarization reorientation means; and reflector means disposed behind the second polarization reorientation means for reflecting light back through the polarization reorientation means.

9. The apparatus of claim 8, wherein the second polarization reorientation means is a retardation plate.

10. The apparatus of claim 1, wherein the polarization altering means is divided into a plurality of picture elements operating independently to either (i) alter the polarization orientation of the light or (ii) allow the polarization orientation of the light to pass through unaffected; and further comprising:

control means for selectively activating the picture elements to form the desired display image, the control means having at least two modes of operation defining an ambient light mode and a backlight mode; and switch means for switching between the ambient light and backlight modes of the control means.

11. The apparatus of claim 10, wherein the control means provides drive signals to select picture elements in the ambient light mode such that the display apparatus operates in a normally white mode; and wherein the control means reverses the picture elements which receive drive signals in the backlight mode such that the display image remains the same between the ambient and backlight modes.

12. The apparatus of claim 1, wherein the polarization altering means is a liquid crystal material.

13. The apparatus of claim 1, wherein the second polarizer means is a wire grid polarizer.

14. A display apparatus for selectively manipulating light from either an ambient light source or an associated internal light source to produce a visible image visible at a viewing orientation defining a front, the apparatus comprising:

first polarizer means configured for polarizing the light so that light having mostly one polarization orientation is passed through the first polarizer means;

polarization altering means disposed behind the first polarizer means for selectively altering the polarization orientation of the light from one polarization orientation to another polarization orientation as it passes through the polarization altering means;

second polarizer means disposed behind the polarization altering means for passing light of mostly one polarization orientation through the second polarizer means and reflecting light of mostly another polarization orientation back through the polarization altering means and first polarizer means, the second polarizer means having a generally parallel arrangement of thin, elongated elements providing means for interaction with electromagnetic waves of the light to generally (i) transmit light having a polarization orientation perpendicular to the elements, and (ii) reflect light having a polarization orientation parallel with the elements;

absorbing means disposed behind the second polarizing means and configured for absorbing the light passed by the second polarizer means; and light emitting means disposed behind the second polarizing means producing and directing light toward the second polarizing means.

15. The apparatus of claim 14, wherein the absorbing means comprises third polarizer means disposed behind the second polarizing means configured for polarizing light so that mostly light of one polarization passes through the third polarizer means while light of another polarization is absorbed; and polarization reorientation means disposed between the third polarizer means and the light emitting means for reorienting the polarization orientation of the light as the light passes through the polarization reorientation means so that the polarization orientation of any light passing through the third polarizer means and polarization reorientation means and reflecting from the light emitting means back through the polarization reorientation means is reoriented from on polarization to another and is thus absorbed by the third polarizer means.

16. The apparatus of claim 15, wherein the polarization reorientation means is a ¼ wave retardation plate.

17. The apparatus of claim 14, wherein the first polarizer means is configured for passing light having mostly a first polarization orientation, the polarization altering means is configured for selectively altering light from the first polarization orientation to a second polarization orientation, the second polarizer means is configured for passing light having mostly the first polarization orientation and reflecting light having mostly the second polarization, and the third polarizer means is configured for absorbing light passed by the second polarizer means.

18. The apparatus of claim 14, wherein the first polarizer means is configured for passing light having mostly a first polarization orientation, the polarization altering means is configured for selectively altering light from the first polarization orientation to a second polarization orientation, the second polarizer means is configured for passing light having mostly the second polarization orientation and reflecting light having mostly the first polarization, and the third polarizer means is configured for absorbing light passed by the second polarizer means.

19. The apparatus of claim 14, wherein the absorbing means comprises:

a sheet of material which absorbs light and which is removably disposed behind the second polarizer means.

20. The apparatus of claim 19, further comprising:

second polarization altering means disposed between the second polarizer means and the light emitting means for reorienting the polarization orientation of the light as the light passed through the second polarization reorientation means; and reflector means disposed behind the second polarization reorientation means for reflecting light back through the polarization reorientation means.

21. The apparatus of claim 20, wherein the second polarization reorientation means is a retardation plate.

22. The apparatus of claim 14, wherein the polarization altering means is divided into a plurality of picture elements operating independently to either (i) alter the polarization orientation of the light or (ii) allow the polarization orientation of the light to pass through unaffected; and further comprising:

control means for selectively activating the picture elements to form the desired display image, the control means having at least two modes of operation defining an ambient light mode and a backlight mode; and switch means for switching between the ambient light and backlight modes of the control means.

23. The apparatus of claim 22, wherein the control means provides drive signals to select picture elements in the ambient light mode such that the display apparatus operates in a normally white mode; and wherein the control means reverses the picture elements which receive drive signals in the backlight mode such that the display image remains the same between the ambient and backlight modes.

24. The apparatus of claim 14, wherein the polarization altering means is a liquid crystal material.

25. The apparatus of claim 14, wherein the second polarizer means is a wire grid polarizer.

26. A display apparatus for manipulating light from either an ambient light source or an associated internal light source to produce a visible image visible at a viewing orientation defining a front, the apparatus comprising:

first polarizer means configured for polarizing the light so that light having mostly one polarization orientation is passed through the first polarizer means;

a layer of liquid crystal material disposed behind the first polarizer means for selectively altering the polarization orientation of the light from one polarization orientation to another polarization orientation as it passes through the layer of liquid crystal material;

a wire grid polarizer disposed behind the layer of liquid crystal material for passing light of mostly one polarization orientation through the wire grid polarizer and reflecting light of mostly another polarization orientation back through the layer of liquid crystal material and first polarizer means;

third polarizer means disposed behind the wire grid polarizer configured for polarizing light so that mostly light of one polarization passes through the third polarizer means while light of another polarization is absorbed;

light emitting means disposed behind the wire grid polarizer for producing and directing light toward the second polarizing means; and a wave retardation plate disposed between the third polarizer means and the light emitting means for reorienting the polarization orientation of the light from one polarization to another polarization as the light passes through the wave plate so that the polarization orientation of any light passing through the third polarizer means and the wave plate and reflecting from the light emitting means back through the wave plate is reoriented from on polarization to another and is thus absorbed by the wire grid polarizer.

27. The apparatus of claim 26, wherein the first polarizer means is configured for passing light having mostly a first polarization orientation, the layer of liquid crystal material is configured for selectively altering light from the first polarization orientation to a second polarization orientation, the wire grid polarizer is configured for passing light having mostly the first polarization orientation and reflecting light having mostly the second polarization, and the third polarizer means is configured for absorbing light passed by the wire grid polarizer.

28. The apparatus of claim 26, wherein the first polarizer means is configured for passing light having mostly a first polarization orientation, the layer of liquid crystal material is configured for selectively altering light from the first polarization orientation to a second polarization orientation, the wire grid polarizer is configured for passing light having mostly the second polarization orientation and reflecting light having mostly the first polarization, and the third polarizer means is configured for absorbing light passed by the wire grid polarizer.

29. The apparatus of claim 26, wherein the layer of liquid crystal material is divided into a plurality of picture elements operating independently to either (i) alter the polarization orientation of the light or (ii) allow the polarization orientation of the light to pass through unaffected; and further comprising:

control means for selectively activating the picture elements to form the desired display image, the control means having at least two modes of operation defining an ambient light mode and a backlight mode; and switch means for switching between the ambient light and backlight modes of the control means.

30. The apparatus of claim 29, wherein the control means provides drive signals to select picture elements in the ambient light mode such that the display apparatus operates in a normally white mode; and wherein the control means reverses the picture elements which receive drive signals in the backlight mode such that the display image remains the same between the ambient and backlight modes.

* * * * *